(12) United States Patent
Onuki et al.

(10) Patent No.: US 9,426,310 B2
(45) Date of Patent: Aug. 23, 2016

(54) TECHNIQUE FOR SETTING PAPER SIZE FOR IMAGE FORMING APPARATUS

(71) Applicant: Konica Minolta, Inc., Chiyoda-ku, Tokyo (JP)

(72) Inventors: Tetsuya Onuki, Toyokawa (JP); Morihisa Kawahara, Toyohashi (JP); Junichi Tanimoto, Toyokawa (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 14/707,444

(22) Filed: May 8, 2015

(65) Prior Publication Data

US 2015/0326744 A1  Nov. 12, 2015

(30) Foreign Application Priority Data

May 9, 2014 (JP) ................................. 2014-097468

(51) Int. Cl.
*G06K 15/02* (2006.01)
*H04N 1/00* (2006.01)

(52) U.S. Cl.
CPC ............ *H04N 1/00* (2013.01); *H04N 1/00567* (2013.01); *H04N 1/00588* (2013.01); *H04N 1/00663* (2013.01); *H04N 1/00708* (2013.01); *H04N 1/00771* (2013.01); *H04N 1/00779* (2013.01); *H04N 2201/0094* (2013.01)

(58) Field of Classification Search
None
See application file for complete search history.

(56) References Cited

U.S. PATENT DOCUMENTS

| 8,632,070 B2* | 1/2014 | Nonaka | B41J 11/003 271/265.01 |
| 8,908,236 B1* | 12/2014 | Rudge | H04N 1/00708 358/449 |
| 8,982,393 B2* | 3/2015 | Gabe | H04N 1/00668 358/1.15 |
| 9,094,555 B2* | 7/2015 | Suese | H04N 1/00782 |
| 2009/0040549 A1* | 2/2009 | Miyamoto | H04N 1/00681 358/1.15 |
| 2013/0088734 A1* | 4/2013 | Kim | H04N 1/00708 358/1.13 |
| 2014/0161476 A1* | 6/2014 | Miyahara | G03G 15/5004 399/45 |

FOREIGN PATENT DOCUMENTS

| JP | 10326064 A | 12/1998 |
| JP | 11157700 A * | 6/1999 |
| JP | 2005187099 A | 7/2005 |
| JP | 2005283874 A | 10/2005 |
| JP | 2010156771 A | 7/2010 |
| JP | 2011010182 A | 1/2011 |
| JP | 2013216395 A | 10/2013 |

OTHER PUBLICATIONS

Japanese Notice of Grounds of Rejection corresponding to Patent Application No. 2014-097468; Mailed: Mar. 29, 2016, with English translation.

* cited by examiner

*Primary Examiner* — Dung Tran
(74) *Attorney, Agent, or Firm* — Cantor Colburn LLP

(57) ABSTRACT

An image forming apparatus indicates on a display a message prompting placement of paper, which is to be placed in a cassette, on a reading device and issuance of an instruction to start reading, in order to set a size of paper placed in the cassette. When touch of a button is detected after the message is indicated and a user operation giving an instruction to start reading is accepted, the image forming apparatus detects the size of placed paper using the reading device. The image forming apparatus then sets the size of paper placed in the cassette to the detected size.

9 Claims, 6 Drawing Sheets

TECHNIQUE FOR SETTING PAPER SIZE FOR IMAGE FORMING APPARATUS

CROSS REFERENCE TO RELATED APPLICATIONS

The present invention claims priority under 35 U.S.C. §119 to Japanese Application No. 2014-097468, filed May 9, 2014, the entire content of which is incorporated herein by reference.

BACKGROUND OF THE INVENTION

1. Field of the Invention

The present invention relates to an image forming apparatus and a control method, and particularly relates to an image forming apparatus capable of feeding paper contained in a cassette and a control method for the image forming apparatus.

2. Description of the Related Art

Some of the image forming apparatuses having the printing capability such as MFP (Multi-Functional Peripheral) are each mounted with a case (cassette) for holding paper to be used for printing and/or a tray (manual feed tray) for placement of externally-fed paper thereon. On the manual feed tray, a sheet of paper that a user wants to use for printing can be placed.

In the case where an image forming apparatus is used to print document data on paper, it is necessary to specify the size of the paper to be used for printing.

As for size setting, the paper size can be set for example on a setting screen of an operation panel. For example, on the cassette-by-cassette basis of the MFP or each time a sheet of paper is placed on the manual feed tray, a paper size can be selected from paper sizes displayed on the setting screen to thereby set each paper size.

The operation for the above-described setting, however, is complicated. Moreover, such an operation is difficult for a user if the user is not familiar with the paper size, which may result in that the user is in error in setting the paper size.

Accordingly, several methods for automatically setting the size have been proposed. As one of these methods, a method has been proposed according to which the paper size is detected by means of a sensor and the paper size is set to the detected size. For example, Japanese Laid-Open Patent Publication Nos. 10-326064 and 11-157700 each disclose a technique according to which a scanner, an automatic document feeder, or a manual paper feed mechanism is used as a sensor to detect the paper size and the paper size for a paper feed tray is automatically set to the detected size.

A user can place a sheet of paper of any size on the manual feed tray. The user therefore has to set the paper size each time the user places a sheet of paper on the manual feed tray. Thus, even if using the automatic setting as disclosed in the above-referenced documents, the user still has to perform an operation for setting the paper size that is different from an operation for printing, before performing the operation for printing. A resultant problem has therefore been that the operation for printing on a sheet of paper on the manual feed tray is complicated.

SUMMARY OF THE INVENTION

An object of an aspect of the present disclosure is to provide an image forming apparatus capable of setting the paper size easily through an operation in accordance with an operation for causing image forming to be executed. An object of another aspect of the present disclosure is to provide a control method for an image forming apparatus capable of setting the paper size easily through an operation in accordance with an operation for causing image forming to be executed.

According to an embodiment, an image forming apparatus includes: a reading device that optically reads a document; a cassette capable of holding paper to be used for printing; a display processing unit that performs a process of indicating on a display a message prompting placement of paper on the reading device and issuance of an instruction to start reading, in order to set a size of paper placed in the cassette; an operation unit that accepts a user operation; a first detection unit that detects the size of paper using the reading device; and a setting unit that sets the size of paper placed in the cassette to the size of paper detected by the first detection unit. The setting unit sets the size of paper placed in the cassette to the size of paper that is detected by the first detection unit in response to a user operation of giving the instruction to start reading, the user operation being accepted by the operation unit after the message is indicated on the display.

Preferably, the image forming apparatus further includes a second detection unit that detects placement of paper on the reading device. The setting unit sets the size of paper placed in the cassette to the size of paper that is detected by the first detection unit in response to the instruction to start reading, the instruction being accepted by the operation unit after placement of paper on the reading device is detected by the second detection unit after the message is indicated on the display.

Preferably, the display processing unit indicates on the display, in a case where a first paper has already been placed on the reading device when the size of paper placed in the cassette is to be set, a message prompting removal of the first paper from the reading device and subsequent placement of paper, which is to be placed in the cassette, on the reading device.

Preferably, the reading device includes a scanner and a transport device that transports paper placed on the reading device to a reading position of the scanner. The display processing unit indicates on the display, in a case where a second paper has already been placed on one of the scanner and the transport device when the size of paper placed in the cassette is to be set, a message prompting placement of paper, which is to be placed in the cassette, on the other one, on which the second paper is not placed, of the scanner and the transport device.

Preferably, the image forming apparatus further includes a third detection unit that detects placement of paper in the cassette. The display processing unit indicates the message on the display when the third detection unit detects placement of paper in the cassette.

According to another embodiment, a control method for an image forming apparatus is a control method for an image forming apparatus including: a reading device that performs an operation of optically reading a document; and a cassette capable of holding paper to be used for printing. The control method includes: indicating on a display a message prompting placement of paper, which is to be placed in the cassette, on the reading device and issuance of an instruction to start reading, in order to set a size of paper placed in the cassette; detecting the size of placed paper using the reading device in response to acceptance of a user operation of giving the instruction to start reading after the message is indicated on the display; and setting the size of paper placed in the cassette to the detected size of the placed paper.

Preferably, the control method further includes detecting placement of paper on the reading device. The setting includes setting the size of paper placed in the cassette to the size of paper, whose placement on the reading device is detected, that is detected with the reading device in response to the instruction to start reading, the instruction being accepted after placement of the paper on the reading device is detected after the message is indicated on the display.

Preferably, the indicating includes indicating on the display, in a case where a first paper has already been placed on the reading device when the size of paper placed in the cassette is to be set, a message prompting removal of the first paper from the reading device and subsequent placement of paper, which is to be placed in the cassette, on the reading device.

Preferably, the reading device includes a scanner and a transport device that transports paper placed on the reading device to a reading position of the scanner. The indicating includes indicating on the display, in a case where a second paper has already been placed on one of the scanner and the transport device when the size of paper placed in the cassette is to be set, a message prompting placement of paper, which is to be placed in the cassette, on the other one, on which the second paper is not placed, of the scanner and the transport device.

Preferably, the control method further includes detecting placement of paper in the cassette. The indicating includes indicating the message on the display when detecting placement of paper in the cassette.

According to a further embodiment, a non-transitory computer-readable storage medium stores a program for causing a computer, which is mounted on an image forming apparatus including: a reading device that optically reads a document; and a cassette capable of holding paper to be used for printing, to execute a process of setting a size of paper placed in the cassette. The program causes the computer to execute: indicating on a display a message prompting placement of paper, which is to be placed in the cassette, on the reading device and issuance of an instruction to start reading, in order to set the size of paper placed in the cassette; detecting the size of placed paper using the reading device in response to acceptance of a user operation of giving the instruction to start reading after the message is indicated on the display; and setting the size of paper placed in the cassette to the detected size of the placed paper.

Preferably, the program further causes the computer to execute detecting placement of paper on the reading device. The setting includes setting the size of paper placed in the cassette to the size of paper, whose placement on the reading device is detected, that is detected with the reading device in response to the instruction to start reading, the instruction being accepted after placement of the paper on the reading device is detected after the message is indicated on the display.

Preferably, the indicating includes indicating on the display, in a case where a first paper has already been placed on the reading device when the size of paper placed in the cassette is to be set, a message prompting removal of the first paper from the reading device and subsequent placement of paper, which is to be placed in the cassette, on the reading device.

Preferably, the reading device includes a scanner and a transport device that transports paper placed on the reading device to a reading position of the scanner. The indicating includes indicating on the display, in a case where a second paper has already been placed on one of the scanner and the transport device when the size of paper placed in the cassette is to be set, a message prompting placement of paper, which is to be placed in the cassette, on the other one, on which the second paper is not placed, of the scanner and the transport device.

Preferably, the program further causes the computer to execute detecting placement of paper in the cassette. The indicating includes indicating the message on the display when detecting placement of paper in the cassette.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
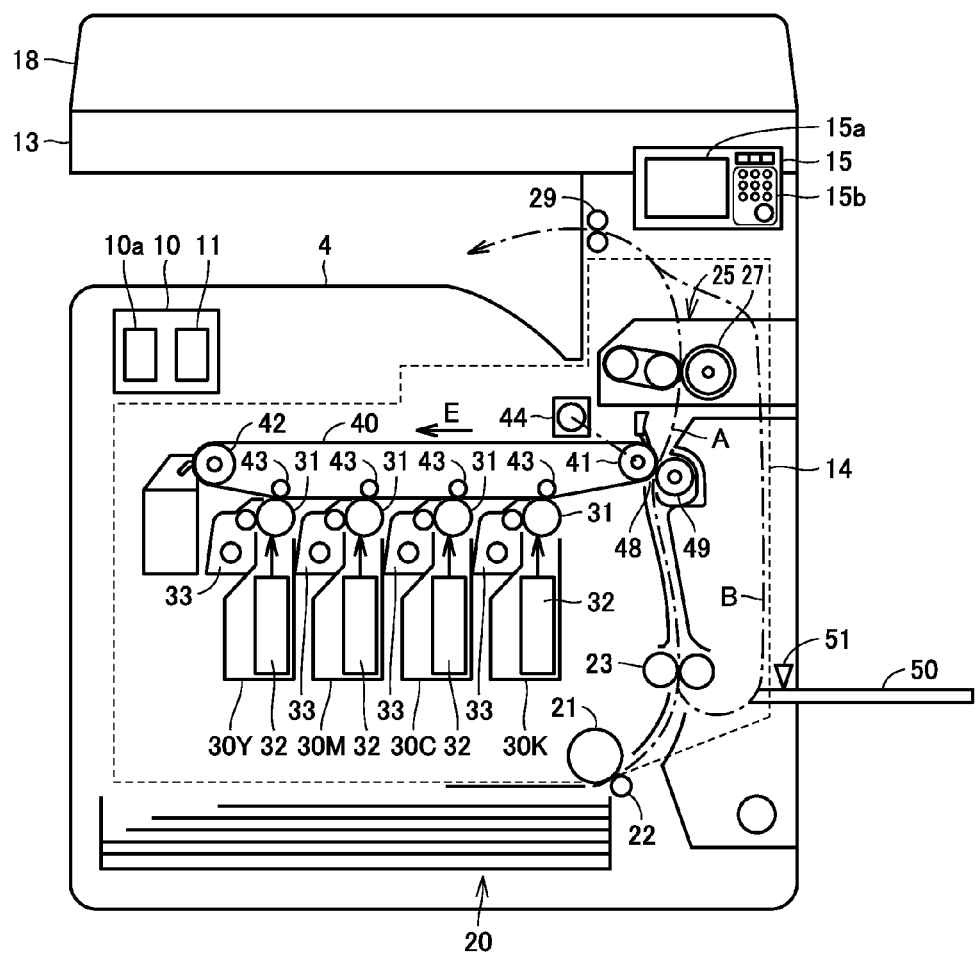
FIG. 1 is a diagram showing a specific example of the apparatus configuration of an MFP (Multi-Functional Peripheral) according to an embodiment.

With reference to the drawings, embodiments of the present invention will hereinafter be described. In the following description, the same parts and the same elements are denoted by the same reference characters. They are named and function identically as well. A description of them will therefore not be repeated.

<Apparatus Configuration>

FIG. 1 is a diagram showing a specific example of the apparatus configuration of an MFP (Multi-Functional Peripheral) 100 as an example of the image forming apparatus according to the present embodiment. By way of example, MFP 100 is an image forming apparatus forming a color image in a tandem system by electrophotography. Referring to FIG. 1, MFP 100 includes a printer 14, a scanner 13 and an ADF (Auto Document Feeder) 18 that serve as a reading device, a control unit 10 which includes a CPU (Central Processing Unit) 10a for controlling the whole apparatus and a memory 11, and an operation panel 15.

Scanner 13 included in the reading device may be a well-known scanner. By way of example, scanner 13 optically reads an image of a document placed on a platen (not shown), decomposes the image into the three primary colors RGB, and converts them into an electrical signal. The electrical signal is transmitted to control unit 10 where a variety of data processing processes are performed on the electrical signal. Moreover, the electrical signal is converted into YMCK (yellow, magenta, cyan, black) as reproduced colors. To control unit 10, image data may be transmitted from an external device such as PC (Personal Computer).

Printer 14 has color units 30Y, 30M, 30C, 30K for respective colors (these units are also referred to collectively as unit 30) each including a photoconductor drum 31, a laser scanning optical unit 32, a developing unit 33, and a charger (not shown). Color units 30 are arranged side by side so that they face an intermediate transfer belt 40.

Intermediate transfer belt 40 is an endless belt and carried on a driving roller 41 and a driven roller 42. Intermediate transfer belt 40 is rotated in the direction E of the arrow by driving roller 41 rotatably driven by a motor 44 which follows control by control unit 10.

Printer 14 has its bottom portion in which a paper feed cassette 20 capable of containing a stack of a plurality of paper sheets is disposed. On a lateral side of printer 14, a tray 50 is disposed which is a so-called manual feed tray and on which a plurality of paper sheets to be inserted externally to the image forming apparatus can be placed.

Tray 50 is provided with a sensor 51 for detecting placement of paper on tray 50. From sensor 51, its detection signal is input to control unit 10. Paper feed cassette 20 may likewise be provided with a sensor for detecting the fact that paper is received. Thus, control unit 10 can detect the fact that paper is placed in the cassette (tray 50, paper feed cassette 20).

A sheet of paper contained in paper feed cassette 20 and a sheet of paper placed on tray 50 are each transported upward through a transport path A. Namely, paper sheets contained in paper feed cassette 20 are guided one by one into transport path A by a paper feed roller 21 and a separation roller 22, and then transported to a secondary transfer nip portion 48 by timing rollers 23. Paper sheets placed on tray 50 are also guided one by one into transport path A and then transported to secondary transfer nip portion 48 by timing rollers 23. Respective rotations of these rollers are controlled by control unit 10.

Based on input image data, a toner image whose color corresponds to the image data is formed on each photoconductor drum 31. The toner images formed respectively on photoconductor drums 31 are successively transferred color by color onto intermediate transfer belt 40 by an electric field applied by primary transfer rollers 43. Accordingly, the toner images of respective colors are synthesized on intermediate transfer belt 40. This transfer is called primary transfer. The synthetic image is transferred at secondary transfer nip portion 48 by an electric field applied by a secondary transfer roller 49, onto paper having been transported through transport path A. This transfer is called secondary transfer. The paper having undergone the secondary transfer is transported to a fixing unit 25 and heated by fixing unit 25. Accordingly, the toner images are fixed on the paper. The paper having undergone the fixing is ejected by ejection rollers 29 to a paper ejection portion 4 which is the upper surface of printer 14.

In the case where an image is to be formed on a second side which is the back side of paper whose first side has the image recorded thereon (double-sided copy), the paper transported through transport path A is switched back by ejection rollers 29. After this, the paper is passed behind fixing unit 25 and fed into a circulation transport path B. Then, the paper with its front and back reversed is transported to timing rollers 23 and fed again to secondary transfer nip portion 48. At secondary transfer nip portion 48, a toner image is transferred to the second side of the paper, and the paper is passed through fixing unit 25 and thereafter ejected by ejection rollers 29 to paper ejection portion 4.

Respective rotations of the aforementioned rollers are controlled by control unit 10.

Operation panel 15 includes a touch panel 15a for displaying an operation screen and accepting a user operation, and a group of keys 15b. Display of the operation screen on touch panel 15a is controlled by control unit 10. An operation signal from the group of keys 15b is input to control unit 10.

Figure 2:
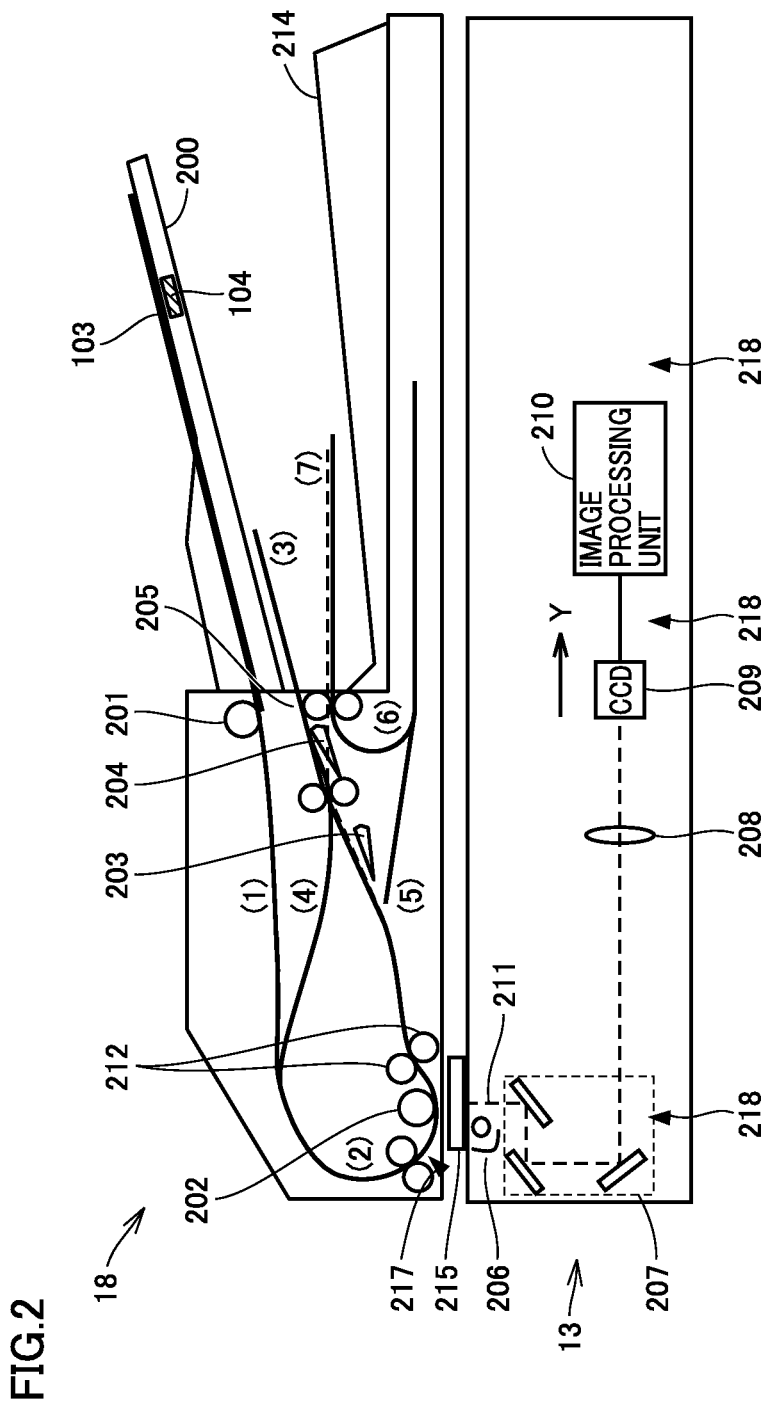
FIG. 2 is a schematic cross-sectional view for illustrating a configuration of a reading device of the MFP.

FIG. 2 is a schematic cross-sectional view of the reading device. Its configuration will be described by means of FIG. 2. Referring to FIG. 2, in ADF 18 included in the reading device, documents 103 stacked on a document tray 200 are fed one by one to a transport path by a paper feed portion 201. A fed document 103 is passed through (1) and (2) of the transport path and transported to a reading position 211.

Scanner 13 included in the reading device uses an exposure unit 206 to expose document 103 which is passing reading position 211. The light reflected from document 103 through the exposure passes through a reading glass 215, which is an example of the sheet-like transparent member, a group of mirrors 207, and a lens 208, and is then received by a CCD (Charge Coupled Device) 209. CCD 209 makes a photoelectric conversion of the received light signal into RGB data and outputs the RGB data to an image processing unit 210. Image processing unit 210 generates image data based on the RGB data. The generated image data is printed for example on a sheet of paper to be output or the like.

Document 103 having passed reading position 211 is transported by post-reading rollers 212 to switch portions 203 and 204. Switch portions 203 and 204 switch the transport path of document 103 upon detecting document 103. Accordingly, document 103 is transported toward (7) of the transport path and ejected to a paper ejection tray 214. Paper ejection tray 214 contains document 103 which has been read and passed from the transport path to the outside. In the case where the other side (back side) of document 103 is to be read, the transport path of document 103 is switched when the document having one side (front side) read at reading position 211 is transported to switch portions 203 and 204. Document 103 is turned upside down by a reverse portion 205. Then, document 103 is transported through (3) and (4) of the transport path and passed to reading position 211. Otherwise, document 103 is passed through (5) and (6) of the transport path by switch portion 203, turned upside down, and ejected.

Document tray 200 of ADF 18 includes a guide member (not shown) for preventing inclination of document 103 when the document is fed from document tray 200 to the transport path. Further, document tray 200 includes a size detection unit 104. Size detection unit 104 detects the size of document 103 on document tray 200 by means of a combination of a position detection sensor (not shown) coupled to the guide member and a plurality of document detection members arranged at predetermined intervals along a straight line extending, in the transport direction, on document tray 200. The sensor is provided, by way of example, at a position corresponding to each document size. Size detection unit 104 inputs to control unit 10 a detection signal indicating whether or not a document touches the sensor at the position. Based on this detection signal, control unit 10 can detect the document size.

In the case where size detection unit 104 is used to detect the dimension in the direction (width direction) orthogonal to the document transport direction, the dimension can be detected based on the distance between transport guides which are provided on document tray 200 and have their positions variable depending on the document width. For example, size detection unit 104 inputs to control unit 10 a resistance value of a gear (not shown) for moving these transport guides. Control unit 10 can calculate the dimension in the width direction of a document from this resistance value. Namely, with a document placed on document tray 200 of ADF 18, control unit 10 can detect the size of the document before transported.

Document tray 200 may include, as another example of size detection unit 104, a paper pass sensor 217 provided on the document transport path. Paper pass sensor 217 detects the leading end and the trailing end of a transported document. Paper pass sensor 217 measures the time taken for the document to pass (from the time the leading end, in the transport direction, of the document passes to the time the trailing end thereof passes). The measured time is input to control unit 10. In the case where a document is fed at a constant transport speed, control unit 10 can measure the dimension, in the transport direction, of a document by multiplying the document transport speed stored in advance by the time taken for the document to pass over the sensor. Namely, from a detection signal which is obtained while a document is transported by ADF 18, control unit 10 can detect the size of the document as well.

Scanner 13 may also include a size detection sensor 218 for detecting the document size, in addition to CCD 209 which is an image sensor. Size detection sensor 218 detects the size of a document placed on the platen (not shown), and inputs the detection signal to control unit 10. Based on this detection signal, control unit 10 can detect the size of the document. As might be expected, control unit 10 can also detect the document size based on a signal from CCD 209. Namely when a document is placed on the platen of scanner 13, control unit 10 can detect the size of the document.

<Overall Operation>

MFP 100 automatically sets the paper size. Usually, the size of paper contained in paper feed cassette 20 is set in advance. Once the paper size is set to a certain size, this size setting is maintained until changed. Therefore, a user initially sets the paper size once, through a manual operation of selecting a paper size from a setting screen (not shown) and setting the paper size to the selected paper size. In this way, the size of paper contained in paper feed cassette 20 is set.

In contrast, on tray 50 which is the so-called manual feed tray, a user can place paper of any size for each printing. Thus, for each printing, the user has to set the paper size. Then, particularly MFP 100 in the present embodiment detects the size of paper placed on tray 50 and sets the paper size based on the result of the detection. Regarding examples in the following, a description will be given of the case where the setting operation is thus performed for paper placed on tray 50. As might be expected, however, a similar setting operation may also be performed for paper contained in paper feed cassette 20. Therefore, the cassette for which the paper size is set herein encompasses both paper feed cassette 20 and tray 50.

At this time, MFP 100 uses a sensor mounted on MFP 100 to detect the paper size. In an example, MFP 100 uses a sensor mounted on scanner 13 to detect the paper size. In another example, MFP 100 uses a sensor mounted on ADF 18 to detect the paper size. When MFP 100 is to set the paper size (preferably upon detecting the fact that paper is placed on tray 50), MFP 100 displays on touch panel 15a a message prompting placement of the paper on scanner 13 or ADF 18. After this, MFP 100 uses a relevant sensor to detect the paper size and sets the size of paper to be used for printing, to the detected paper size.

<Functional Configuration>

Figure 3:
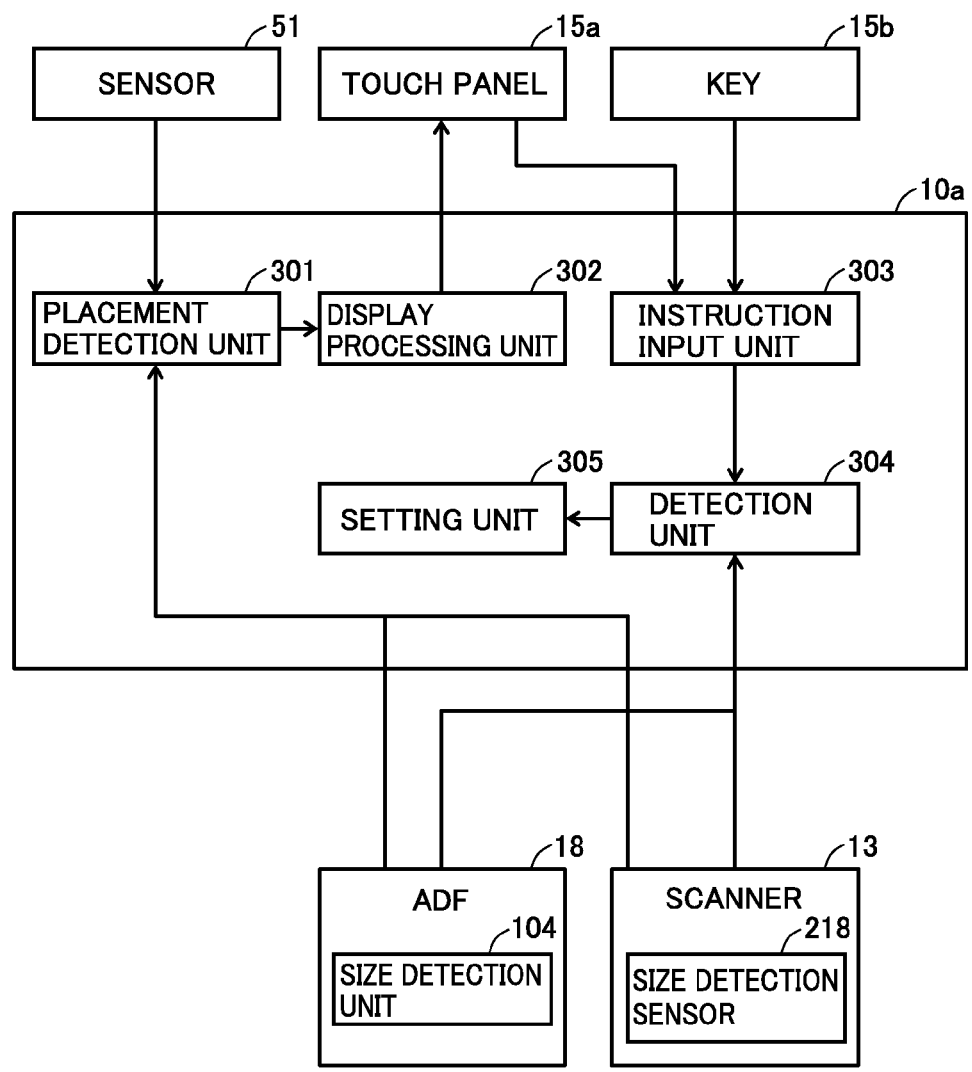
FIG. 3 is a block diagram showing a specific example of the functional configuration of the MFP.

FIG. 3 is a block diagram showing a specific example of the functional configuration of MFP 100 for performing the above-described operations. Each function in FIG. 3 is implemented chiefly by CPU 10a included in control unit 10 of MFP 100, through reading and executing, by CPU 10a, of a program stored in memory 11. At least a part of the functions, however, may be implemented by another hardware component shown in FIGS. 1 and 2 or another hardware component such as an electrical circuit (not shown).

Referring to FIG. 3, CPU 10a includes a placement detection unit 301, a display processing unit 302, an instruction input unit 303, a detection unit 304, and a setting unit 305.

Placement detection unit 301 detects placement of paper on tray 50, based on a detection signal from sensor 51 installed on tray 50. Display processing unit 302 performs a process of displaying on touch panel 15a a message prompting placement of the paper on scanner 13 or ADF 18 and issuance of an instruction to start reading. Input unit 303 accepts input of an operation signal from a group of keys 15b and thereby accepts input of the user's instruction.

In the case where the aforementioned message is displayed on touch panel 15a and thereafter instruction input unit 303 accepts input of the user's instruction to start reading, detection unit 304 causes scanner 13 or ADF 18 to perform a reading operation. Detection unit 304 then detects the paper size based on a detection signal from size detection sensor 218 of scanner 13 or from size detection unit 104 of ADF 18. Preferably, detection unit 304 further detects placement of the paper on scanner 13 or placement of the paper on ADF 18.

In the case where: the aforementioned message is displayed on touch panel 15a; thereafter placement of the paper on scanner 13 or ADF 18 is detected; and thereafter instruction input unit 303 accepts input of the user's instruction to start reading, setting unit 305 sets the size of the paper placed on the cassette (tray 50) to the paper size detected by detection unit 304.

Preferably, in the case where paper (a document) has already been placed on scanner 13 or ADF 18 when placement detection unit 301 detects placement of paper on tray 50, display processing unit 302 performs a process of displaying on touch panel 15a a message prompting removal of the paper (the document) from scanner 13 or ADF 18 and subsequent placement of the paper, which is to be used for printing, on scanner 13 or ADF 18.

Preferably, in the case where paper (a document) has already been placed on one of scanner 13 and ADF 18 when placement detection unit 301 detects placement of paper on tray 50, display processing unit 302 performs a process of displaying on touch panel 15a a message prompting placement of the paper, which is to be used for printing, on the other one, on which the paper (the document) is not placed, of the scanner and ADF.

<Flowchart>

Figure 4:
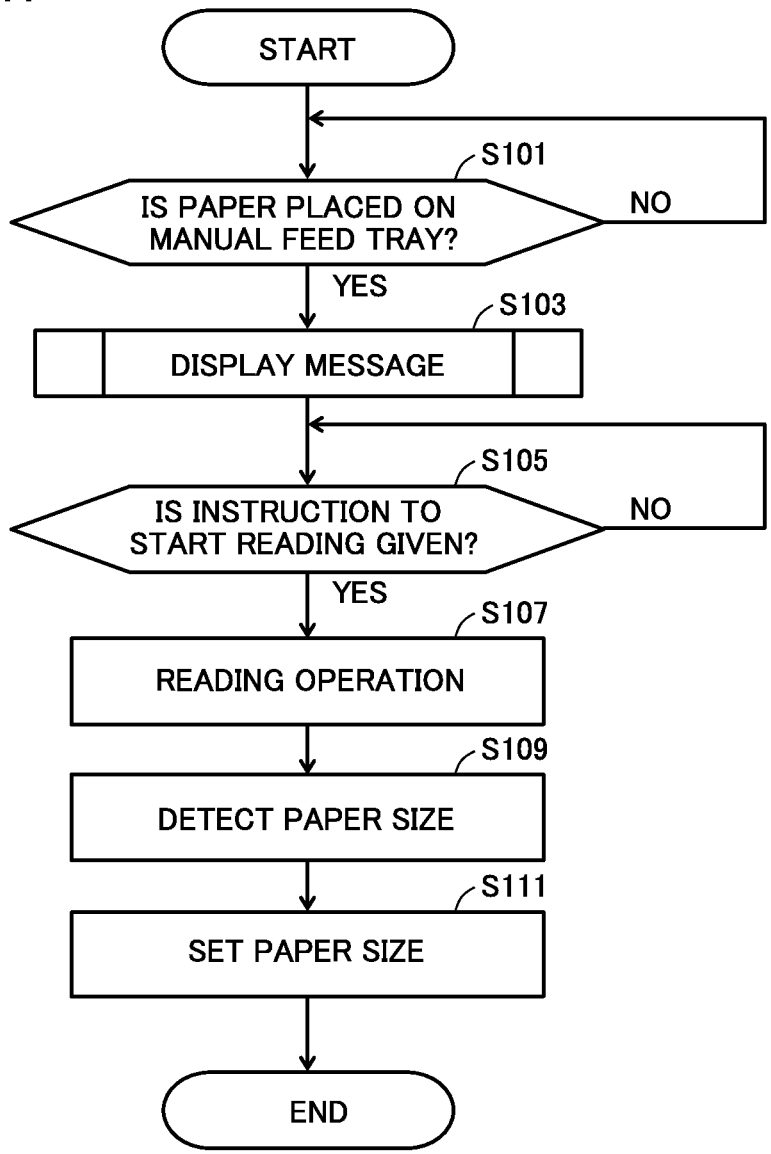
FIG. 4 is a flowchart showing a flow of operations of the MFP.
Figure 5:
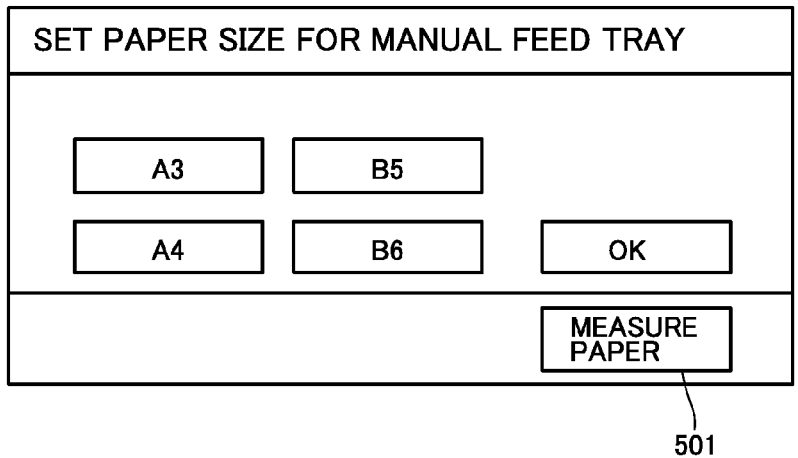
FIGS. 5 to 9 are each a diagram showing a specific example of the operation screen before the paper size is set.
Figure 6:
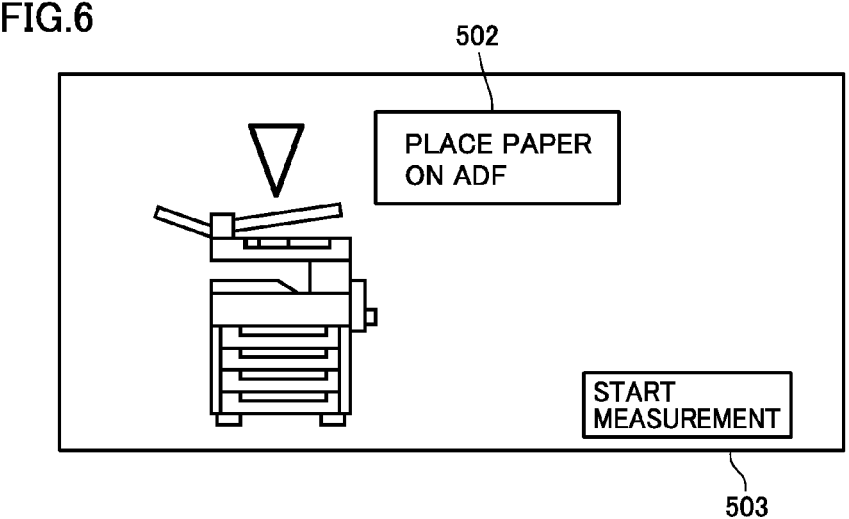
Figure 7:
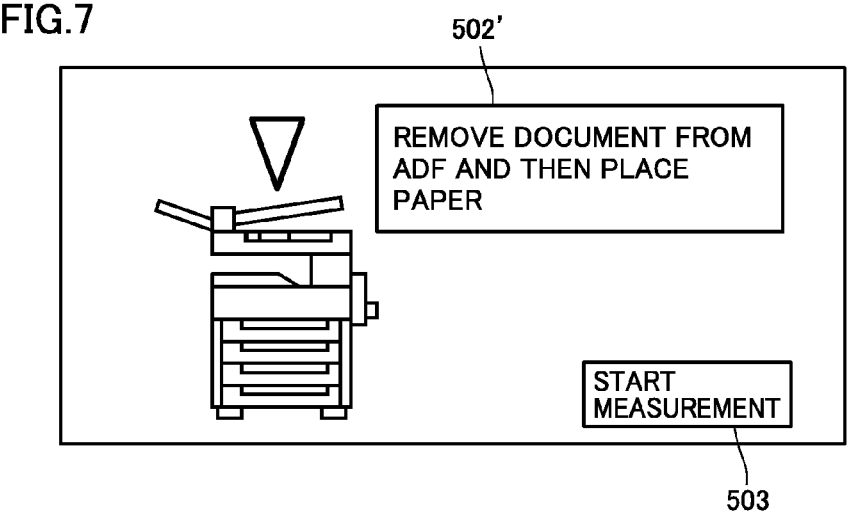

FIG. 4 is a flowchart showing an example flow of operations of MFP 100. FIGS. 5 to 7 each show a specific example of the operation screen before the paper size is set. The operations shown in the flowchart of FIG. 4 are implemented by CPU 10a included in control unit 10 of MFP 100 by its reading and executing a program stored in memory 11 and causing each function in FIG. 3 to be performed.

Referring to FIG. 4, when CPU 10a detects placement of paper on tray 50 (YES in step S101), CPU 10a performs a process for displaying a message (step S103).

By way of example, CPU 10a initially displays on touch panel 15a the setting screen in FIG. 5. The setting screen in FIG. 5 represents a screen for selecting one of the manner of setting the size of the paper placed on tray 50 to a size selected from paper size options or the manner of setting it to a size measured by means of MFP 100, and then setting the paper size in the selected manner. When selection of a paper size from the paper size options displayed on the setting screen in FIG. 5 is accepted, CPU 10a sets the size of the paper placed on tray 50 to the selected size.

In contrast, a user unfamiliar with the paper size may touch a button 501 on the setting screen in FIG. 5. Button 501 is a button used for giving an instruction to measure the paper size. Detecting the fact that button 501 is touched, CPU 10a displays on touch panel 15a a message (screen) in FIG. 6 which prompts placement of the paper, which is to be used for printing, on ADF 18 and issuance of an instruction to start reading, or a message (screen) in FIG. 8 which prompts placement of the paper on scanner 13 and issuance of an instruction to start reading. The screen in FIG. 6 includes a message 502 prompting placement of the paper on ADF 18 and a button 503 for giving an instruction to start measurement. The screen in FIG. 8 includes a message 504 prompting placement of the paper on scanner 13 and a button 505 for giving an instruction to start measurement.

Figure 8:
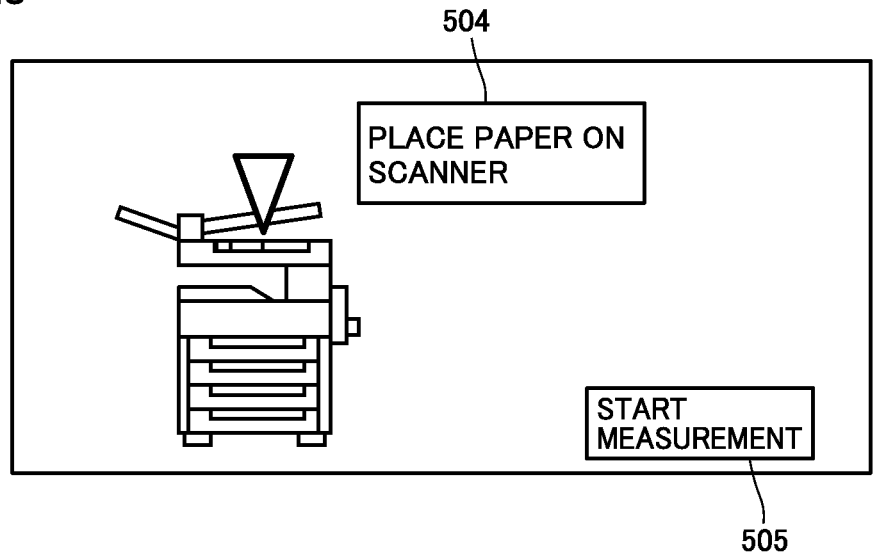

Preferably, CPU 10a specifies in advance which of respective screens in FIGS. 6 and 8 is to be displayed, namely which of ADF 18 and scanner 13 is to be used for measurement of the paper size. Alternatively, in the case where ADF 18 is not mounted on MFP 100, CPU 10a preferably displays the screen in FIG. 8 so that scanner 13 is used for measurement of the paper size.

Preferably, detecting the fact that button 501 on the setting screen in FIG. 5 is touched, CPU 10a detects whether or not paper (a document) is placed on ADF 18 and whether or not the document is placed on scanner 13. Then, CPU 10a determines to use one of ADF 18 and scanner 13 that does not have the document placed thereon, for measuring the paper size which is used for printing, and displays on touch panel 15a a relevant screen (FIG. 6 or 8).

Alternatively, preferably CPU 10a specifies in advance which of ADF 18 and scanner 13 is to be used for measurement of the paper size, and detects whether or not paper (a document) is placed on one of the ADF and the scanner that is to be used for measurement of the paper size which is used for printing, as specified. Then, in the case where the paper (the document) is placed on the one of them that is to be used for measurement of the paper size, CPU 10a displays a message (screen) prompting removal of the document and subsequent placement of the paper to be used for printing.

In the case for example where ADF 18 is to be used for measurement of the paper size and where paper (a document) has already been placed on ADF 18 when touch of button 501 on the screen in FIG. 5 is detected, CPU 10a displays on touch panel 15a the screen in FIG. 7. The screen in FIG. 7 includes a message 502' prompting removal of the document from ADF 18 and subsequent placement of the paper, which is to be used for printing, on ADF 18, and a button 503 for giving an instruction to start measurement.

Figure 9:
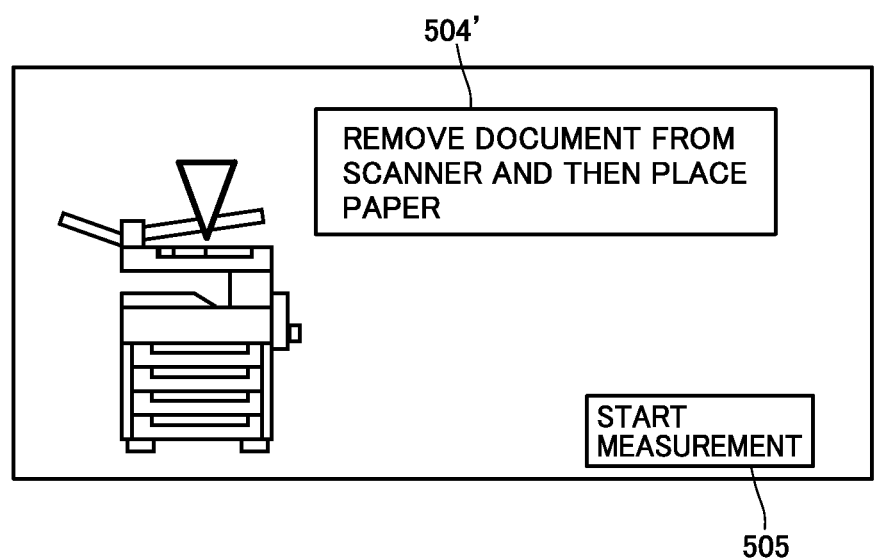

In another case for example where scanner 13 is to be used for measurement of the paper size and where paper (a document) has already been placed on scanner 13 when touch of button 501 on the screen in FIG. 5 is detected, CPU 10a displays on touch panel 15a the screen in FIG. 9. The screen in FIG. 9 includes a message 504' prompting removal of the document from scanner 13 and subsequent placement of the paper, which is to be used for printing, on scanner 13, and a button 505 for giving an instruction to start measurement.

When button 503, 505 is touched after any of the screens in FIGS. 6 to 9 is displayed and accordingly the instruction to start measurement is given (YES in step S105), CPU 10a performs an operation of reading the placed paper by means of a sensor of ADF 18 or scanner 13 (step S107).

Preferably, in the case where: any of the screens in FIGS. 6 to 9 is displayed, thereafter placement of the paper on ADF 18 or scanner 13 is detected, and thereafter button 503, 505 is touched for giving the instruction to start measurement, CPU 10a performs the operation of reading the paper.

A specific example of the above is as follows. In the case where no paper has already been placed on ADF 18 or scanner 13 when touch of button 501 on the screen in FIG. 5 is detected and where the paper is placed after one of the screens in FIGS. 6 to 9 is displayed, CPU 10a can detect that the paper to be used for printing is placed after any of the screens in FIGS. 6 to 9 is displayed.

Alternatively, it is supposed that MFP 100 is provided with a sensor for detecting opening and closing of scanner 13. In this case, CPU 10a can detect that the paper to be used for printing is placed after the screen in FIG. 8 or 9 is displayed, when opening or closing of scanner 13 is detected after the screen in FIG. 8 or 9 is displayed.

Alternatively, in the case where paper has already been placed on ADF 18 or scanner 13 when touch of button 501 on the screen in FIG. 5 is detected and the screen in FIG. 7 or 9 is thereafter displayed, CPU 10a scans the paper being placed at the time touch of button 501 on the screen in FIG. 5 is detected and scans the paper placed after the screen in FIG. 7 or 9 is placed, and compares these sheets of paper from each other. If a difference between these sheets of paper is found (particularly if the density of the latter sheet of paper is lower than the density of the former sheet of paper, CPU 10a can detect that the paper to be used for printing is placed after the screen in FIG. 7 or 9 is displayed.

Based on a detection signal from the sensor of ADF 18 or scanner 13, CPU 10a detects the paper size (step S109) and sets the size of the paper placed on tray 50 to the detected paper size (step S111).

<Effects of the Embodiments>

The above-described operations performed by MFP 100 enable a user to easily set the size of paper placed in the cassette of MFP 100. Namely, a series of user's operations from placement of paper in the cassette to setting of the paper size is a series of operations similar to that performed for printing, namely a series of operations following a workflow to be done by the user. The user therefore can easily perform the operation for setting the size of the placed paper without regarding the operation for setting the size thereof as a special operation. Accordingly, even if a user is not accustomed to the paper size or how to operate the MFP, the user can utilize the MFP with ease.

Further, the sensor mounted on the scanner or the ADF can be used to measure the size of the paper placed in the cassette as described above. It is thus unnecessary to install in the cassette a sensor adapted to measure the paper size. Accordingly, the apparatus configuration can be simplified.

<Other Examples>

A program for causing the CPU of the MFP to execute the above-described operations can also be provided. Such a program can be provided to cause an existing MFP to operate as the above-described MFP 100.

Such a program can be recorded on a computer-readable recording medium such as flexible disk, CD-ROM (Compact Disk-Read only Memory), ROM, RAM, and memory card given in combination with a computer, and can accordingly be provided in the form of a program product. Alternatively, the program may be provided by being recorded on a recording medium such as hard disk incorporated in a computer. The program may also be provided by being downloaded through a network.

The program in the present disclosure may call required modules in a predetermined sequence and at predetermined timings from program modules provided as a part of an operating system (OS) of a computer, and then cause the called modules to perform processing. In this case, the above-described modules are not included in the program itself, and processing is executed in cooperation with the OS. Such a program that does not include these modules may be included in the program in the present disclosure.

Moreover, the program in the present disclosure may also be provided by being incorporated in a part of another program. In this case as well, the program itself does not include modules included in the aforementioned other program, and processing is executed in cooperation with the other program. Such a program which is incorporated in the other program may also be included in the program in the present disclosure.

The program product to be provided is installed on a program storage unit such as hard disk and then executed. The program product includes the program itself and a recording medium on which the program is recorded.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An image forming apparatus comprising:
   a document reader configured to optically read a document;
   a paper holder configured to hold paper to be used for printing; and
   a processor configured to execute:
      indicating on a display a message prompting placement of paper on said document reader and issuance of an instruction to start reading, in order to set a size of paper placed in said paper holder;
      accepting a user operation;
      detecting the size of paper using said document reader; and
      setting the size of paper placed in said paper holder to the size of paper detected by said processor,
   wherein said processor is configured to set the size of paper placed in said paper holder to the size of paper that is detected in response to a user operation of giving said instruction to start reading, said user operation being accepted by said processor after said message is indicated on said display;
   said document reader comprises a scanner and a paper feeder configured to transport paper placed on said document reader to a reading position of said scanner, and
   said processor is configured to indicate on said display, in a case where a second paper has already been placed on one of said scanner and said paper feeder when the size of paper placed in said paper holder is to be set, a message prompting placement of paper, which is to be placed in said paper holder, on a one of said scanner and said paper feeder on which said second paper is not placed.

2. The image forming apparatus according to claim 1, wherein said processor is further configured to detect placement of paper on said document reader, and
   said processor is configured to set the size of paper placed in said paper holder to the size of paper that is detected by said processor, after said instruction to start reading, in response to placement of paper on said document reader being detected by said processor after said message is indicated on said display.

3. The image forming apparatus according to claim 1, wherein said processor is further configured to detect placement of paper in said paper holder, wherein
   said processor is configured to indicate said message on said display when placement of paper in said paper holder is detected.

4. A control method for an image forming apparatus,
   said image forming apparatus comprising a document reader that performs an operation of optically reading a document; and a paper holder configured to hold paper to be used for printing, said control method comprising:
      indicating on a display a message prompting placement of paper, which is to be placed in said paper holder, on said document reader and issuance of an instruction to start reading, in order to set a size of paper placed in said paper holder;
      detecting the size of placed paper using said document reader in response to acceptance of a user operation of giving said instruction to start reading after said message is indicated on said display; and
      setting the size of paper placed in said paper holder to the detected size of said placed paper;
   wherein said document reader comprises a scanner and a paper feeder that transports paper placed on said document reader to a reading position of said scanner, and
   said indicating comprises indicating on said display, in a case where a second paper has already been placed on one of said scanner and said paper feeder when the size of paper placed in said paper holder is to be set, a message prompting placement of paper, which is to be placed in said paper holder, on a one of said scanner and said paper feeder on which said second paper is not placed.

5. The control method for an image forming apparatus according to claim 4, further comprising detecting placement of paper on said document reader, wherein
   said setting comprises setting the size of paper placed in said paper holder to the size of paper, whose placement on said document reader is detected, that is detected with said document reader in response to said instruction to start reading, said instruction being accepted after placement of said paper on said document reader is detected after said message is indicated on said display.

6. The control method for an image forming apparatus according to claim 4, further comprising detecting placement of paper in said paper holder, wherein
   said indicating comprises indicating said message on said display when detecting placement of paper in said paper holder.

7. A non-transitory computer-readable storage medium storing a program for causing a computer, which is mounted on an image forming apparatus comprising: a document reader that optically reads a document; and a paper holder capable of holding paper to be used for printing, to execute a process of setting a size of paper placed in said paper holder, said program causing said computer to execute:
   indicating on a display a message prompting placement of paper, which is to be placed in said paper holder, on said document reader and issuance of an instruction to start reading, in order to set the size of paper placed in said paper holder;
   detecting the size of placed paper using said document reader in response to acceptance of a user operation of giving said instruction to start reading after said message is indicated on said display; and
   setting the size of paper placed in said paper holder to the detected size of said placed paper;
   wherein said document reader comprises a scanner and a paper feeder that transports paper placed on said document reader to a reading position of said scanner, and
   said indicating comprises indicating on said display, in a case where a second paper has already been placed on one of said scanner and said paper feeder when the size of paper placed in said paper holder is to be set, a message prompting placement of paper, which is to be placed in said paper holder, on a one of said scanner and said paper feeder on which said second paper is not placed.

8. The non-transitory computer-readable storage medium according to claim 7, wherein
   said program further causes said computer to execute detecting placement of paper on said document reader, and
   said setting comprises setting the size of paper placed in said paper holder to the size of paper, whose placement on said document reader is detected, that is detected with said document reader in response to said instruction to start reading, said instruction being accepted after placement of said paper on said document reader is detected after said message is indicated on said display.

9. The non-transitory computer-readable storage medium according to claim 7, wherein
   said program further causes said computer to execute detecting placement of paper in said paper holder, and
   said indicating comprises indicating said message on said display when detecting placement of paper in said paper holder.

* * * * *